United States Patent
Tyagi

(10) Patent No.: US 10,606,561 B2
(45) Date of Patent: Mar. 31, 2020

(54) QUANTUM RANDOM NUMBER GENERATOR

(71) Applicant: LyfGen Ltd., London (GB)

(72) Inventor: Rahul Dev Tyagi, Iver Heath (GB)

(73) Assignee: LYFGEN LTD, London (GB)

( * ) Notice: Subject to any disclaimer, the term of this patent is extended or adjusted under 35 U.S.C. 154(b) by 0 days.

(21) Appl. No.: 16/110,093

(22) Filed: Aug. 23, 2018

(65) Prior Publication Data

US 2020/0065069 A1    Feb. 27, 2020

(51) Int. Cl.
*G06F 7/58*   (2006.01)
*G06N 10/00*  (2019.01)

(52) U.S. Cl.
CPC .............. *G06F 7/588* (2013.01); *G06N 10/00* (2019.01)

(58) Field of Classification Search
CPC ................................................. G06F 7/58–588
USPC .................................................. 708/250–256
See application file for complete search history.

(56) References Cited

U.S. PATENT DOCUMENTS

2003/0131031 A1   7/2003  Klass

FOREIGN PATENT DOCUMENTS

WO   WO2010/062161 A2   6/2001
WO   WO2009/064167 A2   5/2009

OTHER PUBLICATIONS

OpenStaxCollege, "College Physics", chapter "Multiple Slit Diffraction", Jan. 2012, retrieved from https://opentextbc.ca/physicstestbook2/chapter/multiple-slit-diffraction/ (Year: 2012).*
Wikipedia.org, "Diffraction Grating", Jul. 2018, retrieved from https://en.wikipedia.org/wiki/Diffraction_grating (Year: 2018).*
ScienceDirect.com, "Diffraction Grating", 2019, retrieved from https://www.sciencedirect.com/topics/physics-and-astronomy/diffraction-grating (Year: 2019).*
Yuan, Z.L., et al.; "Robust Random Number Generation Using Steady-State Emission of Gain-Switched Laser Diodes", Applied Physics Letters 104, 261112 (2014), Published Online Jul. 2, 2014, 6 pages.
Gabriel, Christian, et al.; "A Generator for Unique Quantum Random Numbers Based on Vacuum States", Nature Photonics DOI:10.1038/NPhoton.2010.197, Published Online Aug. 29, 2010, pp. 711-715.

* cited by examiner

*Primary Examiner* — Matthew D Sandifer
(74) *Attorney, Agent, or Firm* — Haynes and Boone, LLP

(57) ABSTRACT

A system for generating random numbers comprising a first particle source configured to emit sequentially a plurality of particles towards a first screen comprising one or more slits configured to produce a first diffraction pattern at a first detector by random scattering of the particles; wherein the first detector comprises a plurality of regions each configured to trigger the generation of an output signal upon stimulation of the region by a particle, such that the output signals generated by the first detector are indicative of the positions of the plurality of particles in the first diffraction pattern; and a processor configured to process the output signals from the plurality of regions to thereby generate at least one random number based on the random scattering of the particles.

23 Claims, 2 Drawing Sheets

FIG. 1a
*(Prior Art)*
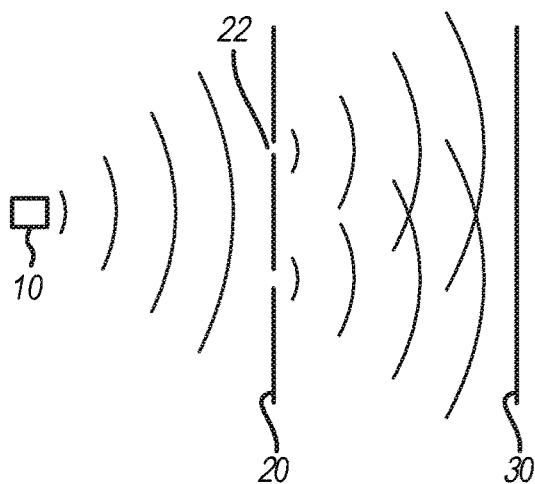
FIG. 1b
*(Prior Art)*
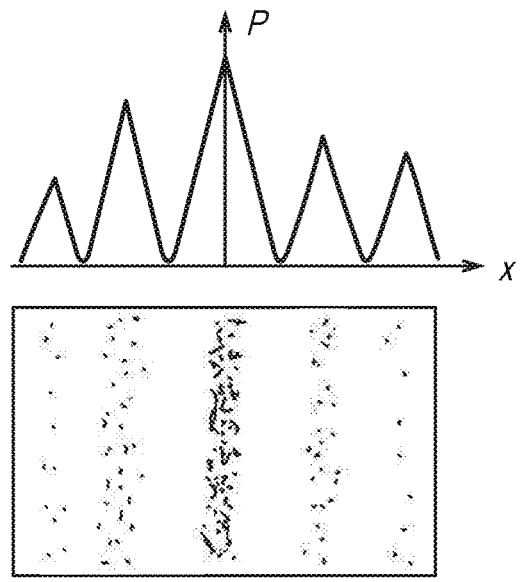
FIG. 1c
*(Prior Art)*
FIG. 2
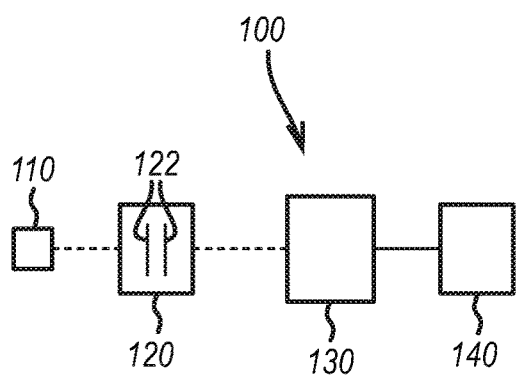
FIG. 3
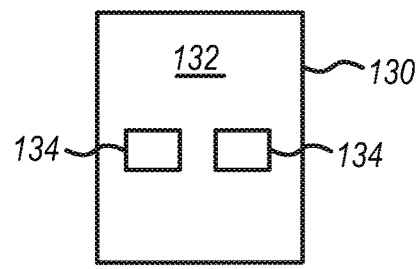
FIG. 4
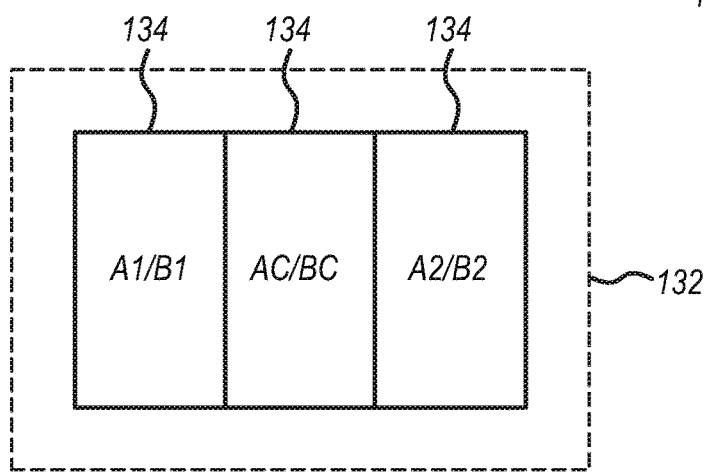

QUANTUM RANDOM NUMBER GENERATOR

TECHNICAL FIELD

The present invention relates to systems and methods for generating one or more random numbers.

BACKGROUND

Random Number Generation

Generating random numbers is essential in numerous fields of modern technology. In particular, in the field of cryptography, random numbers are used to establish secure connections between devices. The two most common types of method used to generate random numbers are physical methods and computational methods.

Physical methods are generally based on measuring a physical source of entropy, such as radioactive decay, the cosmic microwave background or atmospheric noise. However, these methods often suffer from systematic bias in the measurement process, or the entropy source itself, which tends to result in a non-uniform distribution of random numbers.

Computational methods use algorithms to generate "pseudo-random numbers" based on a seed input value. As suggested by the term "pseudo-random", these random numbers are not in fact random at all since each output is completely determined by the seed value and the algorithm; such pseudo-random number generators only appear to generate random series of numbers.

In cryptographic applications it is important that the random numbers are used are as random as possible. Each of the above described types of random number generation either display a systematic bias do not generate true random numbers. This allows a malicious observer of a series of random numbers produced by a device operated by these methods to determine a "fingerprint" of the random number generator, that is, information about the generator from which certain characteristics of the random number production may be deduced. Such a fingerprint allows the malicious observer to predict future random numbers either exactly or at least with an improved probability of being correct. Therefore, a true random number generator that does not suffer from non-randomness or systematic bias is desirable.

A number of techniques for generating random numbers using essentially quantum mechanical systems have been proposed, for example, particle decay, or experiments involving passing photons through beam-splitters in interferometers.

Quantum Diffraction Through Slits

The wave-like properties of light have been known to scientists for hundreds of years; Young demonstrated the diffraction of light through two slits in 1803. As quantum mechanics was discovered the particle-like properties of light were also observed. In 1924, de Broglie proposed that material particles, such as electrons, might also possess wave-like properties. Schrödinger formalised de Broglie's idea, stating that all matter was defined by its wavefunction which defines a probability amplitude of a particle's state. A corollary of this definition is the probabilistic nature of a particle's state; until the state of a particle is measured, the probability of that particle being in any particular state can only be known with a certain probability. In 1961 Jönsson demonstrated diffraction of electrons through slits. As individual particles travel across a double slit experiment, it is only possible to predict with a certain probability where each particle might arrive and it is not possible to determine the route by which they travelled without destroying the diffraction pattern.

FIG. 1(a) shows the classic arrangement of the double slit experiment. A particle source 10 emits particles towards a screen 20 comprising two slits 22. The particles are diffracted by the slits 22 and form a diffraction pattern on a detector 30 illuminated by the slits. FIG. 1(b) shows the probability distribution of the position of a particle's arrival at the detector, clearly demonstrating its wave-like properties. FIG. 1(c) shows an example of the positions of particles as they are received at the detector, illustrated as dots, demonstrating particle-like behaviour as they are detected. As more particles are received the interference fringes become more apparent.

SUMMARY OF DISCLOSURE

The invention relates to a system for generating random numbers. The system comprises a first particle source configured to emit sequentially a plurality of particles towards a first screen comprising one or more slits configured to produce a first diffraction pattern at a first detector by random scattering of the particles. The first detector comprises a plurality of regions each configured to trigger the generation of an output signal upon stimulation of the region by a particle, such that the output signals generated by the first detector are indicative of the positions of the plurality of particles in the first diffraction pattern. The system further comprises a processor configured to process the output signals from the plurality of regions to thereby generate at least one random number based on the random scattering of the particles. Using random scattering of particles as they diffract through slits enables the generation of a true random number since it is impossible to predict which region of the detector will be stimulated by a particle.

The output signal triggered by stimulation of each of the plurality of regions may be unique to that region. This enables the processor to determine precisely which region of the detector was stimulated by a particle.

Each of the output signals may be associated with a unique number-value, preferably stored in a look-up table accessible by the processor. This enables the generation of different number-values using a single detector. The processor may be configured to generate a sequence of one or more number-values based upon the output signals triggered by stimulation of the plurality of regions by the plurality of particles. Generating a sequence of number-values enables the production of a string of random numbers. Generating one random number for each stimulation is a particularly efficient way of generating random number since only one particle is required to generate each random number.

The plurality of regions may comprise a first region and a second region. The first region and the second region may be sized and positioned such that the probability of the first region being stimulated by a particle is equal to the probability of the second region being stimulated by a particle. Having regions with equal probabilities ensures no random number is more likely to be generated than any other random number.

The unique number-value associated with the output signal that is generated by stimulation of the first region may be a '0' and the unique number-value associated with the output signal that is generated by stimulation of the second region may be a '1'. Generating a binary output is particularly beneficial where a computer, which may receive the number-value, operates using a binary system. By combining two or more of the number-values, random numbers larger than 1 may be produced in binary form.

The plurality of regions may comprise a central region positioned between the first region and the second region. The processor may be configured to generate a null-value based upon the output signal triggered by stimulation of the central region by a particle of the plurality of particles. The presence of a central region between the first and second regions aids the detector in determining which of the first and second regions has been stimulated by a particle—if the first and second regions share a boundary and a particle arrives close to that boundary, the resolution of the detector may hinder an exact determination of which side of the boundary the particle arrived.

The processor may configured to generate a unique number-value based on a plurality of output signals triggered by stimulation of the plurality of regions by the plurality of particles. The plurality of regions may comprise a first region and a second region. The probability of the first region being stimulated by a particle may be equal to the probability of the second region being stimulated by a particle. The processor may configured to: generate a unique number-value of '0' if the first detector detects that the first region is stimulated more than the second region over a period of time; generate a unique number-value of '1' if the first detector detects that the first region is stimulated less than the second region over a period of time; generate a null-value if the first detector detects that the first region is stimulated an equal number of times as the second region over a period of time. Using many particles to generate a single random number presents an alternative means of generating a random number which may be particularly advantageous for highly active particle sources.

The probability of any one region being stimulated may be equal to the probability of any other being stimulated. This ensures that the random numbers are generated without any systematic bias. It may be particularly advantageous where there are ten regions since, in this case, a single machine may generate ten integers 0 to 9.

The system may further comprise at least a second particle source configured to emit sequentially a plurality of particles towards a second screen comprising one or more slits configured to produce a second diffraction pattern at a second detector by random scattering of the particles. The second detector may comprise a plurality of regions each configured to trigger the generation of an output signal upon stimulation of the region by a particle, such that the output signals generated by the second detector are indicative of the positions of the plurality of particles in the second diffraction pattern. The processor may be further configured to process the output signals from the plurality of regions of the second detector to generate the at least one random number based on the random scattering of the particles. Using two or more machines may help to increase the security of the system against an intruder. For example, each machine may be checked against the other to determine whether or not its output is being interfered with.

Each of the first and second detectors may comprise a central region and an outer region surrounding the central region. Each detector may be associated with a unique number-value.

The processor may be configured to generate the unique number-value associated with one of the first and second detectors. The processor may be configured to generate the number-value of the first detector if the output signal from the first detector is triggered by stimulation of the central region of the first detector and the output signal from the second detector is triggered by stimulation of the outer region, and output a null-value otherwise.

The first particles may be electrons, photons, atoms, hadrons, leptons, molecules, or compounds. Preferably the first particles are electrons. Using electrons is preferred since they are easy to manufacture and to control since they possess an electro-magnetic field.

Each of the plurality of regions of the one or more detectors may comprise a subsection of each detector. This enables each detector to be constructed from a single detecting element. Alternatively, each of the plurality of regions of the one or more detectors may comprise an individual subdetector, wherein the plurality of subdetectors forms each detector. This reduces the computational effort required to distinguish one region of a detector from another.

The processor may be located in one or more of: the one of more of the detectors; a processing circuitry attached to the detector; a computer; and an external server.

The processor may have access to instructions for implementing a learning algorithm configured to receive the output signals triggered by stimulation of the plurality of regions and thereby adjust the size and position of each of the plurality of regions such that the probabilities of the plurality of regions being stimulated by a particle are equal to predefined probabilities. This allows the system to adapt to minor variations in the properties of the diffraction pattern at the detector and to effect any necessary changes in compensation for any physical inconsistencies in the systems setup.

There may be one or more additional screens, each comprising one or more slits, arranged between: the first screen and the first detector; and/or between one or more of the second screens and second detectors. This allows the properties of the diffraction patterns at the detectors to be adjustable. For example, it enables the overall spread of the probability distribution of the diffraction pattern across the detector to be narrowed or widened or to be focussed towards or away from particular regions of the detector.

The system may be comprised within a computer. This enables a computer to have easy access to a source of random numbers. The system may be comprised within a component for a computer. This allows an existing computer to be equipped with a source of random numbers. The system may be comprised within a portable device attachable to a computer. This allows an entity to have source of random numbers that is easily transportable.

The invention also relates to a method of generating random numbers. A first step comprises emitting, sequentially, a plurality of particles from a first particle source towards a first screen comprising one or more slits and thereby producing a first diffraction pattern at a first detector by random scattering of the particles. A second step comprises triggering the generation of an output signal upon stimulation of one of a plurality of regions of the first detector by a particle, the output signal being indicative of the position of the particle in the first diffraction pattern. A third step comprises processing the output signal to generate at least one random number based on the random scattering of the particle.

The method may comprise associating each of the output signals with a unique number-value, and preferably storing the association in a look-up table. A sequence of one or more number-values based upon output signals triggered by stimulation of the plurality of regions by the plurality of particles may be generated.

The method may comprises associating a unique number-value of '0' to the output signal that is generated by stimulation of a first region, and associating a unique number-value of '1' to the output signal that is generated by stimulation of a second region.

The plurality of regions may comprise a central region positioned between the first region and the second region. The method may comprise the step of generating a null-value based upon an output signal triggered by stimulation of the central region by a particle of the plurality of particles.

A unique number-value based on a plurality of output signals triggered by stimulation of the plurality of regions by the plurality of particles may be generated. The plurality of regions may comprise a first region and a second region. The probability of the first region being stimulated by a particle may be equal to the probability of the second region being stimulated by a particle. A unique number-value of '0' may be generated if the first detector detects that the first region is stimulated more than the second region over a period of time. A unique number-value of '1' may be generated if the first detector detects that the first region is stimulated less than the second region over a period of time. A null-value may be generated if the first detector detects that the first region is stimulated an equal number of times as the second region over a period of time.

The method may comprise the step of emitting, sequentially, a plurality of particles from at least a second particle source towards a second screen comprising one or more slits and thereby producing a second diffraction pattern at a second detector by random scattering of the particles. The second detector may comprise a plurality of regions each configured to triggering the generation of an output signal upon stimulation of one of a plurality of regions of the second detector by a particle, the output signal being indicative of the position of the particle in the second diffraction pattern. The method may comprise the step of processing the output signal to generate the at least one random number based on the random scattering of the particle.

A computer, a component for a computer, or a portable device attachable to a computer may be configured to perform the method of the invention.

BRIEF DESCRIPTION OF THE DRAWINGS

The present invention will now be described with reference to the accompanying drawings in which:

FIGS. 1a, 1b, and 1c show exemplary illustrations of the double slit experiment of quantum particles;

FIG. 2 shows the configuration of a system of the invention;

FIG. 3 shows the arrangement of detecting regions of a detector as viewed from the screen in accordance with an embodiment of the invention;

FIG. 4 shows the arrangement of detecting regions of a detector as viewed from the screen in accordance with an embodiment of the invention;

DETAILED DESCRIPTION

Figure 5:
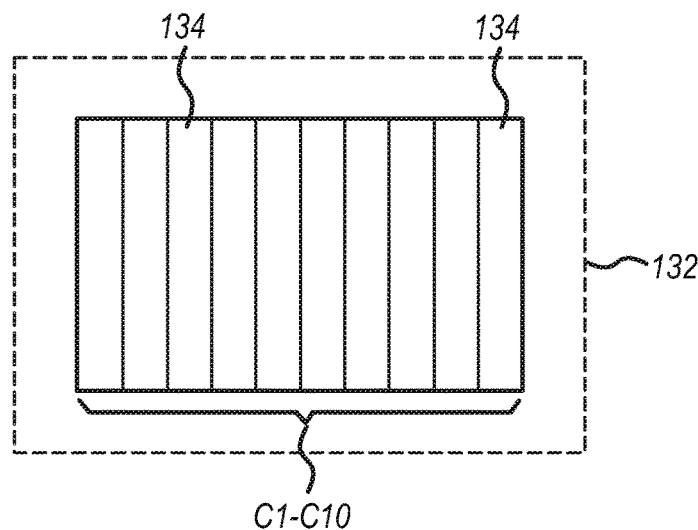
FIG. 5 shows the arrangement of detecting regions of a detector as viewed from the screen in accordance with an embodiment of the invention.

The following detailed disclosure outlines the features of one specific embodiment of the present invention. In addition, some (but by no means all) variants of one embodiment that might be implemented whilst still falling under the scope of the present invention are also described.

The General Embodiment

According to one embodiment of the present invention shown in FIG. 2, a first system 100 for generating random numbers includes a particle source 110, a screen 120, a detector 130 and a processor 140. The screen 120 comprises one or more slits 122 through which particles emitted by the particle source 110 diffract. Thus, the basic form of the claimed system is analogous to the classic double slit experiment.

The particle source 110 emits a series of particles towards the screen 120 and the detector 130. Thus, the particle source 110 illuminates the detector 130 via the screen. Different types of particle sources emit different types of particle. For example, a monochromatic light source, such as a laser, may be used to produce photons, and a cathode ray tube may be used to produce electrons. Any type of particle may be used in the system, such as electrons, photons, atoms, hadrons, leptons, molecules, or compounds since each possesses quantum mechanical properties and will, therefore, diffract through slits. Electrons are easy to manipulate using an electromagnetic field and demonstrate quantum mechanical properties more readily than large molecules. The particle source 110 emits the particles sequentially, that is, one after the other such that there is sufficient separation between individual particles in the system that they do not interfere with each other. Additionally, the particle source 110 emits the particles with sufficient separation that the detector 130 has sufficient time to recover between receiving each particle.

The screen 120, which is illuminated by the particle source 110, causes the particles to diffract due to the presence of the one or more slits 122. The screen 120, therefore, produces a diffraction pattern of particles at the detector 130. In the preferred embodiment, there are two slits. Except at the slits 122, the screen 120 is formed of a material that is impenetrable by the particles emitted by the particle source 110. The material of the screen 120 is selected based on the type of particles used in the system. In one example, there are one or more additional screens, each comprising one or more slits, arranged between the screen 120 and the detector 130. The particles may additionally diffract through each of these screens before arriving at the detector 130.

The particles are detected by the detector 130 which is positioned and orientated to receive the particles diffracted by the one or more slits 122. Due to the diffraction of the particles by the one or more slits 122, individual particles are randomly scattered across the detector 130 according to a probability distribution determined by the wavefunction of the particles as they travel through the system. It is not possible to predict where each particle will arrive. The type of detector is selected based on the type of particles used in the system. In the preferred embodiment, in which electrons are used, an electron detector is used. The detector 130 has sufficient resolution to discern the position of an individual particle's arrival.

As shown in FIG. 3, which shows the detector 130 as viewed from the screen 120, the detector 130 has an overall particle receiving area 132. Within the overall particle receiving area 132 there are a plurality of detecting regions 134. There may or may not be gaps between each of the detecting regions 134. In one embodiment, the overall particle receiving area 132 the detector 130 is a single detector and each of the detecting regions 134 is a subsection of that single detector. The single detector is divided up into the subsections electronically. This allows the size and position of the detecting regions 134 to be adjustable. In another embodiment, the detecting regions 134 are each formed by an individual subdetector. Therefore, the detector 130 may in fact comprise a plurality of subdetectors. Since it is physically possible for some particles to be diffracted at wide angles by the slits, the entire diffraction pattern of particles may not fall completely within the overall particle receiving area 132 of the detector. That is, the particles diffracted at wide angles will not be received in the overall particle receiving area and hence probability of every particle emitted by the particle source 110 being received in the overall particle receiving area 132 is less than 1. The overall receiving area 132 may be flat surface or a curved surface centred on the slits 122.

When a particle is detected, the detector 130 generates an output signal that comprises information about the position on the detector 130 at which the particle is detected. In particular, each detecting region 134 of the detector 130 generates an output signal when a particle is detected at that detecting region 134 of the detector 130. Each output signal comprises information about which detecting region 134 of the detector 130 a particle was detected in. The output signal may be an electronic or optical signal and is of a form suitable for processing by a computer.

Each detecting region 134 may generate a unique output signal, or two or more detecting regions 134 may generate identical output signals. In the latter case, the detecting regions 134 having identical output signals are effectively treated as a single detecting region 134, albeit, split over two separated locations within the overall particle detecting area 132.

The detector 130 is in communication with a processor 140. The processor 140 may be part of the detector 130, a processing circuitry attached to the detector 130, or it may reside separately to the detector 130, for example, in separate computer or an external server. The processor 140 receives the output signals from the detecting regions 134. The processor 140 then processes the output signals to thereby generate at least one random number. The processor 140 processes the output signals according to a predefined logic. That is, once the processor 140 has received one or more output signals from the detecting regions 134 it will generate a predictable number based on algorithms of the logic—the randomness enters the system through the random positions at which the particles are received at the detector 130. The processor 140 may generate one random number for each output signal received at the processor 140 (and, therefore, for each particle received at the detector 130), or it may generate one random number based on a combination of output signals received at the processor 140. Over time, if the system is allowed to run, the processor 140 generates a sequence of random numbers.

Specific Embodiments

In one embodiment, each output signal is associated with a unique number-value. On each occasion that the processor 140 receives an output signal, the processor 140 generates the unique number-value associated with that output signal. The generated unique number-value is random by virtue of the random nature of the location of the particle's arrival at the detector 130. Therefore, the processor 140 generates a sequence of random numbers formed of multiple unique number-values as multiple output-signals are received. Since the output-signals received by the processor 140 are dependent on the detecting regions at which particles are received which is random, the sequence of unique number-values generated by the processor 140 is random. The correspondences of each output signal with its unique number-value is, for example, stored in a look-up table accessible by the processor 140. Alternatively, the processor 140 may use an algorithm to output a unique number-value based on an inputted output signal.

In one embodiment shown in FIG. 4, the plurality of detecting regions 134 comprises a first region A1 and a second A2. The first region A1 and the second region A2 are sized and positioned within the overall particle detecting area 132 such that the probability of a particle being received at the first region A1 is equal to the probability of a particle being received at the second region A2. That is, whilst the position of each particle's arrival at the detector 130 is impossible to predict, the distribution of the positions of many particle's arrival is defined by the probability associated with the wavefunction of the particles as they travel through the slits 122 at the screen 120. The size and position of the first region A1 and the second region A2 is such that the probability associated with the wavefunction of the particles is equal across the regions. The unique number-value associated with the output signal generated by the first region A1 is a '0' and the unique number-value associated with the output signal generated by the second region A2 is a '1'. Since there is a random but equal probability of the first region A1 detecting a particle or the second region A2 detecting a particle, the processor 140 generates randomly a '0' or a '1' but with equal probability. As multiple particles are detected at the detector 130 the processor 140 generates a random sequence of '0's and '1's. There is a central region AC disposed between the first region A1 and the second region A2. Either there is no subdetector present in the central region AC or the output signal generated by the central region when a particle is detected there is associated with a null-value by the processor 140. In other words, no random number is generated by the processor 140 when a particle is detected at the central region AC. In one specific embodiment, the probability of the central region AC receiving a particle is 0.25, the probability of the first region receiving a particle is 0.375, and the probability of the second region receiving a particle is 0.375. However, any other choice of probabilities may be used providing the probability of the first region receiving a particle is equal to the probability of the second region receiving a particle.

In another embodiment also shown in FIG. 4, the processor 140 generates one random number based on a combination of output signals received at the processor 140. In particular, the processor 140 generates a unique number-value based on a plurality of output signals received by the processor 140 from the detecting regions 134. The plurality of detecting regions 134 comprises a first region B1 and a second region B2. The first region B1 and the second region B2 are sized and positioned within the overall particle detecting area 132 such that the probability of a particle being received at the first region B1 is equal to the probability of a particle being received at the second region B2. As the processor 140 receives output signals it divides them into groups. Alternatively, the detector 130 itself performs the division and transmits the groups of output signals to the processor 140. Each group comprises either a predetermined number of output signals or all of the output signals received over a predetermined period of time. The predetermined number of output signals may be 100. The first group comprises, for example, the first 100 output signals received or the output signals received over the first 100 seconds, and the second group comprises the second 100 output signals or the output seconds received over the second 100 seconds, etc. For each group of output signals, the processor 140: generates a unique number-value of '0' if more of the output signals were produced by the first region B1 than the second region B2; generates a unique number-value of '1' if more of the output signals were produced by the second region B2 than the first region B1; or generates a null-value, that is no random number, if the output signals were produced equally by the first region B1 and the second region B2. Similarly to the previous embodiment, there may be a central region BC between the first region B1 and the second region B2 whose output signal is disregarded.

In another embodiment, the probability of any one detecting region 134 receiving a particle is equal to the probability of any other detecting region 134 receiving a particle. In a specific embodiment, shown in FIG. 5, there are ten detecting regions C1-C10, each with an equal probability of receiving a particle. Each of the output signals of the 10 detecting regions is associated with a unique number-value, in particular, the numbers 0-9. The processor 140 therefore generates a random sequence of the integers 0-9 according detecting regions 134 at which a sequence of particles are detected.

Figure 6:
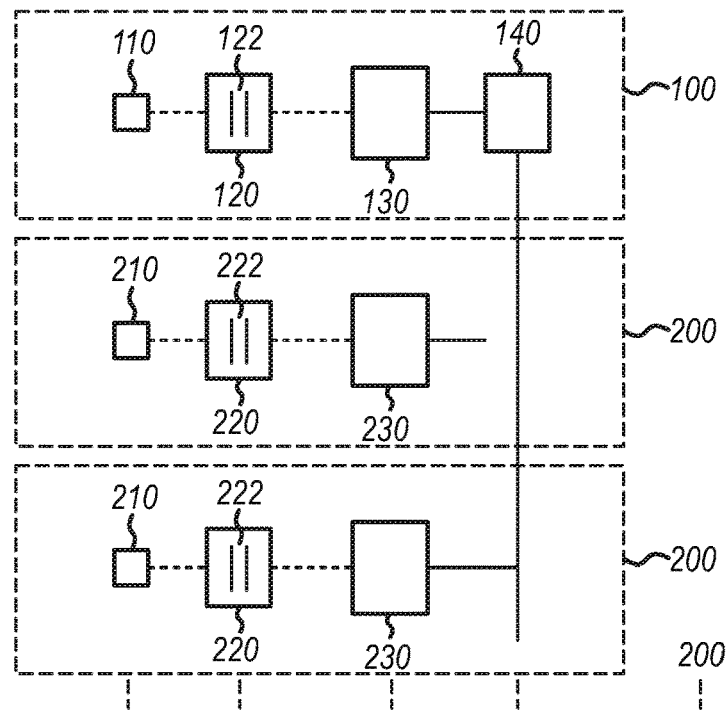
FIG. 6 shows the configuration of the invention comprising multiple systems.

In another embodiment shown in FIG. 6, there is the first system 100 discussed above which comprises a particle source 110, a screen 120 with at least one slit 122, a detector 130 and a processor. Additionally, there are one or more second systems 200 arranged separately from the first system 100. Each of the at least one second systems comprises a second particle source 210, a second screen 220, and a second detector 230. The second particle source 210, the second screen 220, and the second detector 230 are arranged in exactly the same configuration as the particle source 110, the screen 120 and the detector 130 of the first system 100. In other words, each second particle source 210 emits particles towards the second screen 220 which comprises a plurality of slits 222 which produced a second diffraction pattern of the particles at the second detector 230. In one example, there are one or more additional screens, each comprising one or more slits, arranged between one or more of the second screens 220 and the second detectors 230. The particles may additionally diffract through each of these screens before arriving at the detector 130. The first system 100 and the at least one second system 200 share the same processor 140. Moreover, the second particle source 210, a second screen 220, and a second detector 230 are identical to the particle source 110, the screen 120 and the detector 130 of the first system 100, for example, the second detector 230 also comprises an overall particle detecting area 232 with a plurality of detecting regions 234 each of which generates an output signal upon detection of a particle. The processor 140 receives the output signals generated by the detecting regions 134 of the detector 130 of the first system 100 and the output signals generated by the detecting regions 234 of the at least one second detector 230. The processor then processes the output signals to thereby generate at least one random number. The at least one random number is therefore generated in accordance with the distributions of particles at the detector 130 and the at least one second detector 230.

Figure 7:
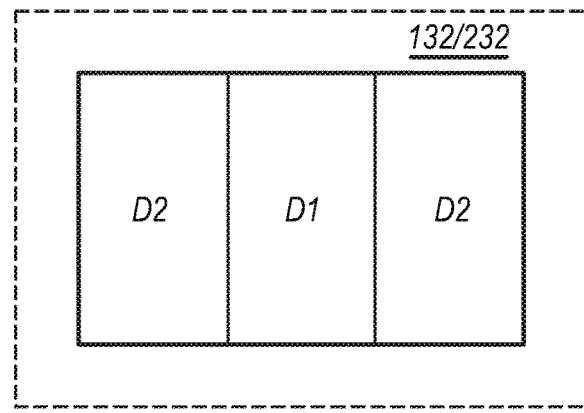
FIG. 7 shows the arrangement of detecting regions of a detector as viewed from the screen in accordance with an embodiment of the invention.

As illustrated in FIG. 7, each of the detectors 130, 230 comprises a central detecting region D1 and an outer detecting region D2 surrounding the central detection region D1. Each of the detecting regions D1, D2 of each of the detectors 130, 230 generates a unique output signal upon detecting a particle. Each detector 130, 230 is associated with a unique number-value. In order to generate a random number in this embodiment, the processor 140 receives and records a single output signal from each of the detectors 130, 230. If just one of the output signals recorded is indicative of a central detecting region D1 of one of the detectors 130, 230 detecting a particle and each of the remaining output signals recorded are indicative of the outer detecting regions D2 of the remaining detectors 130, 230 detecting a particle, then the processor generates as the random number the unique number-value associated with the detector 130, 230 whose central detecting region D1 detected a particle. If more than one of the output signals are indicative of a particle being received in a central region D1, then the processor 140 generates a null-value, that is, no random number. If none of the output signals are indicative of a particle being received in a central region D1, then the processor 140 generates a null-value, that is, no random number. To generate a sequence of random numbers, the processor 140 repeats the process of receiving, recording and analysing a group of single output signals from each detector 130, 140.

In a specific embodiment, there are two detectors in total, detector A and detector B. The unique number-value associated with detector A is '0' and the unique number-value associated with detector B is '1'. Each detector has a central detecting region D1 and an outer detecting region D2 as described above. The processor 140 receives and records an output signal from each of the detectors. If the output signal from detector A is indicative of its central detecting region D1 detecting a particle and the output signal from detector B is indicative of its central detecting region D1 detecting a particle, then the processor generates null-value, that is, no random number. If the output signal from detector A is indicative of its central detecting region D1 detecting a particle and the output signal from detector B is indicative of its outer detecting region D1 detecting a particle, then the processor generates the unique number-value of detector A, that is, a '0'. If the output signal from detector A is indicative of its outer detecting region D1 detecting a particle and the output signal from detector B is indicative of its central detecting region D1 detecting a particle, then the processor generates the unique number-value of detector B, that is, a '1'. If the output signal from detector A is indicative of its outer detecting region D1 detecting a particle and the output signal from detector B is indicative of its outer detecting region D1 detecting a particle, then the processor generates a null-value, that is, no random number.

In a further embodiment, the particle sources 130, 230 are configured to count the number of particles they emit towards the screen. The processor 140 is, therefore, able to determine whether and how many particles are not detected by the detectors 130, 230.

In a further embodiment, the processor has access to instructions for implementing a learning algorithm. The learning algorithm is configured to receive the output signals generated by the plurality of detecting regions and to thereby adjust the size and position of each of the plurality of detecting regions such that the probabilities of the plurality of detecting regions receiving a particle are equal to pre-defined probabilities. The output signals from a large number of particle detections, for example 1000, 10,000 or 100,000 detections, are inputted into the learning algorithm as data upon which to base the calculations. This allows the systems 100, 200 to adjust for any bias caused as a result of imperfect arrangement of the particle sources, screens and detectors, or as a result of slight variations between systems.

A learning algorithm may also assist in cases where advanced quantum mechanical calculations are necessary to determine the wavefunction of particles at the detectors.

In a further embodiment the above described system is incorporated within computer, specifically within the hardware of the computer. The operating algorithms for the system may be stored within a software system of the computer. Alternatively, the system is contained within a hardware component for a computer or a portable device attachable to a computer. The hardware component and portable device may removably or permanently attachable to the computer and is adapted to communicate with the computer. The operating algorithms for the system may be stored within a software system of the hardware component or they may be installable onto a software system of the computer itself. The portable device may be a USB stick.

The components of the systems, devices and methods described herein may be utilised and/or manufactured in combination, or separately, in various ways which will be appreciated by the skilled person.

The invention claimed is:

1. A system for generating random numbers comprising:
 a first particle source configured to emit sequentially a plurality of particles towards a first screen comprising one or more slits configured to produce a first diffraction pattern at a first detector by random scattering of the particles;
 wherein the first detector comprises a plurality of regions each configured to trigger the generation of an output signal upon stimulation of the region by a particle, such that the output signals generated by the first detector are indicative of the positions of the plurality of particles in the first diffraction pattern; and
 a processor configured to process the output signals from the plurality of regions to thereby generate at least one random number based on the random scattering of the particles wherein the plurality of regions comprises a first region and a second region, wherein the first region and the second region are sized and positioned such that the probability of the first region being stimulated by a particle is equal to the probability of the second region being stimulated by a particle.

2. The system of claim 1, wherein the output signal triggered by stimulation of each of the plurality of regions is unique to that region.

3. The system of claim 1, wherein each of the output signals is associated with a unique number-value, and wherein the processor is configured to generate a sequence of one or more number-values based upon the output signals triggered by stimulation of the plurality of regions by the plurality of particles.

4. The system of claim 1, wherein the unique number-value associated with the output signal that is generated by stimulation of the first region is a '0' and the unique number-value associated with the output signal that is generated by stimulation of the second region is a '1'.

5. The system of claim 4, wherein the plurality of regions further comprises a central region positioned between the first region and the second region, and wherein the processor is configured to generate a null-value based upon the output signal triggered by stimulation of the central region by a particle of the plurality of particles.

6. The system of claim 1, wherein the processor is configured to generate a unique number-value based on a plurality of output signals triggered by stimulation of the plurality of regions by the plurality of particles;
 wherein the processor is configured to:
 generate a unique number-value of '0' if the first detector detects that the first region is stimulated more than the second region over a period of time;
 generate a unique number-value of '1' if the first detector detects that the first region is stimulated less than the second region over a period of time;
 generate a null-value if the first detector detects that the first region is stimulated an equal number of times as the second region over a period of time.

7. The system of claim 1, wherein the probability of any one region being stimulated is equal to the probability of any other being stimulated.

8. The system of claim 1, further comprising:
 at least a second particle source configured to emit sequentially a second plurality of particles towards a second screen comprising one or more slits configured to produce a second diffraction pattern at a second detector by random scattering of the particles;
 wherein the second detector comprises a plurality of regions each configured to trigger the generation of an output signal upon stimulation of the region by a particle, such that the output signals generated by the second detector are indicative of the positions of the plurality of particles in the second diffraction pattern;
 wherein the processor is further configured to process the output signals from the plurality of regions of the second detector to generate the at least one random number based on the random scattering of the particles.

9. The system of claim 8, wherein each of the first and second detectors comprises a central region and an outer region surrounding the central region, and wherein each detector is associated with a unique number-value.

10. The system of claim 9, wherein the processor is configured to generate the unique number-value associated with one of the first and second detectors, wherein the processor is configured to generate the number-value of the first detector if the output signal from the first detector is triggered by stimulation of the central region of the first detector and the output signal from the second detector is triggered by stimulation of the outer region, and output a null-value otherwise.

11. The system of claim 1, wherein the first particles are electrons, photons, atoms, hadrons, leptons, molecules, or compounds.

12. The system of claim 1, wherein each of the plurality of regions of the first detector comprises either:
 a subsection of the first detector; or
 an individual subdetector, wherein the plurality of subdetectors forms the first detector.

13. The system of claim 1, wherein the processor is located in one or more of:
 the one of more of the detectors;
 a processing circuitry attached to the detector;
 a computer; and
 an external server.

14. The system of claim 1, wherein there are one or more additional screens, each comprising one or more slits, arranged between: the first screen and the first detector.

15. The system of claim 1 at least partly comprised within any of:
 a computer;
 a component for a computer; or
 a portable device attachable to a computer.

16. A system for generating random numbers comprising:
 a first particle source configured to emit sequentially a plurality of particles towards a first screen comprising one or more slits configured to produce a first diffraction pattern at a first detector by random scattering of the particles;

wherein the first detector comprises a plurality of regions each configured to trigger the generation of an output signal upon stimulation of the region by a particle, such that the output signals generated by the first detector are indicative of the positions of the plurality of particles in the first diffraction pattern; and a processor configured to process the output signals from the plurality of regions to thereby generate at least one random number based on the random scattering of the particles, wherein the processor has access to instructions for implementing a learning algorithm configured to receive the output signals triggered by stimulation of the plurality of regions and thereby adjust the size and position of each of the plurality of regions such that the probabilities of the plurality of regions being stimulated by a particle are equal to predefined probabilities.

17. A method of generating random numbers comprising:

emitting, sequentially, a plurality of particles from a first particle source towards a first screen comprising one or more slits and thereby producing a first diffraction pattern at a first detector by random scattering of the particles;

triggering the generation of an output signal upon stimulation of one of a plurality of regions of the first detector by a particle, the output signal being indicative of the position of the particle in the first diffraction pattern; and processing the output signal to generate at least one random number based on the random scattering of the particle, wherein the plurality of regions comprises a first region and a second region, wherein the first region and the second region are sized and positioned such that the probability of the first region being stimulated by a particle is equal to the probability of the second region being stimulated by a particle.

18. The method of claim 17, further comprising associating each of the output signals with a unique number-value and generating a sequence of one or more number-values based upon output signals triggered by stimulation of the plurality of regions by the plurality of particles.

19. The method of claim 18, further comprising associating a unique number-value of '0' to the output signal that is generated by stimulation of a first region, and associating a unique number-value of '1' to the output signal that is generated by stimulation of a second region.

20. The method of claim 17, wherein the plurality of regions further comprises a central region positioned between the first region and the second region, and further comprising the step of generating a null-value based upon an output signal triggered by stimulation of the central region by a particle of the plurality of particles.

21. The method of claim 17, further comprising generating a unique number-value based on a plurality of output signals triggered by stimulation of the plurality of regions by the plurality of particles; and further comprising at least one of the following steps:

generating a unique number-value of '0' if the first detector detects that the first region is stimulated more than the second region over a period of time;

generating a unique number-value of '1' if the first detector detects that the first region is stimulated less than the second region over a period of time;

generating a null-value if the first detector detects that the first region is stimulated an equal number of times as the second region over a period of time.

22. The method of claim 17, further comprising:

emitting, sequentially, a second plurality of particles from at least a second particle source towards a second screen comprising one or more slits and thereby producing a second diffraction pattern at a second detector by random scattering of the particles;

wherein the second detector comprises a plurality of regions each configured to trigger the generation of a second output signal upon stimulation of one of a plurality of regions of the second detector by a particle, the second output signal being indicative of the position of the particle in the second diffraction pattern;

processing the second output signal to generate the at least one random number based on the random scattering of the particles.

23. A system comprising:

a non-transitory memory; and one or more hardware processors coupled to the non-transitory memory and configured to read instructions from the non-transitory memory to cause the system to perform operations comprising:

emit, sequentially, a plurality of particles from a first particle source towards a first screen comprising one or more slits and thereby producing a first diffraction pattern at a first detector by random scattering of the particles;

trigger the generation of an output signal upon stimulation of one of a plurality of regions of the first detector by a particle, the output signal being indicative of the position of the particle in the first diffraction pattern; and process the output signal to generate at least one random number based on the random scattering of the particle, wherein the plurality of regions comprises a first region and a second region, wherein the first region and the second region are sized and positioned such that the probability of the first region being stimulated by a particle is equal to the probability of the second region being stimulated by a particle.

* * * * *